United States Patent [19]

Bowman, Jr.

[11] 4,203,617

[45] May 20, 1980

[54] VEHICLE LOAD SUPPORTING STRUCTURE

[75] Inventor: Miles A. Bowman, Jr., Reading, Pa.

[73] Assignee: Dana Corporation, Toledo, Ohio

[21] Appl. No.: 892,272

[22] Filed: Mar. 31, 1978

[51] Int. Cl.² .............................................. B62D 21/00
[52] U.S. Cl. ................................. 280/797; 301/124 R
[58] Field of Search ............... 301/124 R, 124 H, 125, 301/126, 127; 180/43 R; 280/781, 797

[56] References Cited

U.S. PATENT DOCUMENTS

| 2,366,698 | 1/1945 | Cole | 280/781 |
| 2,685,479 | 8/1954 | Buckendale | 301/124 R |
| 2,911,262 | 11/1959 | Franck | 301/124 R |

FOREIGN PATENT DOCUMENTS 2636655  2/1978  Fed. Rep. of Germany .......... 280/784

*Primary Examiner*—John J. Love
*Assistant Examiner*—John A. Carroll
*Attorney, Agent, or Firm*—Wilson, Fraser, Barker & Clemens

[57] ABSTRACT

A vehicle load supporting structure including a formed elongate composite metal body having at least one portion formed to support a load, and an adjacent portion for supporting a load. The one portion of the metal body formed from metal being a predetermined yield strength and at least a portion of the adjacent portion of the body formed of a metal having a yield strength lower than the predetermined strength of the first mentioned portion and being welded thereto.

5 Claims, 8 Drawing Figures

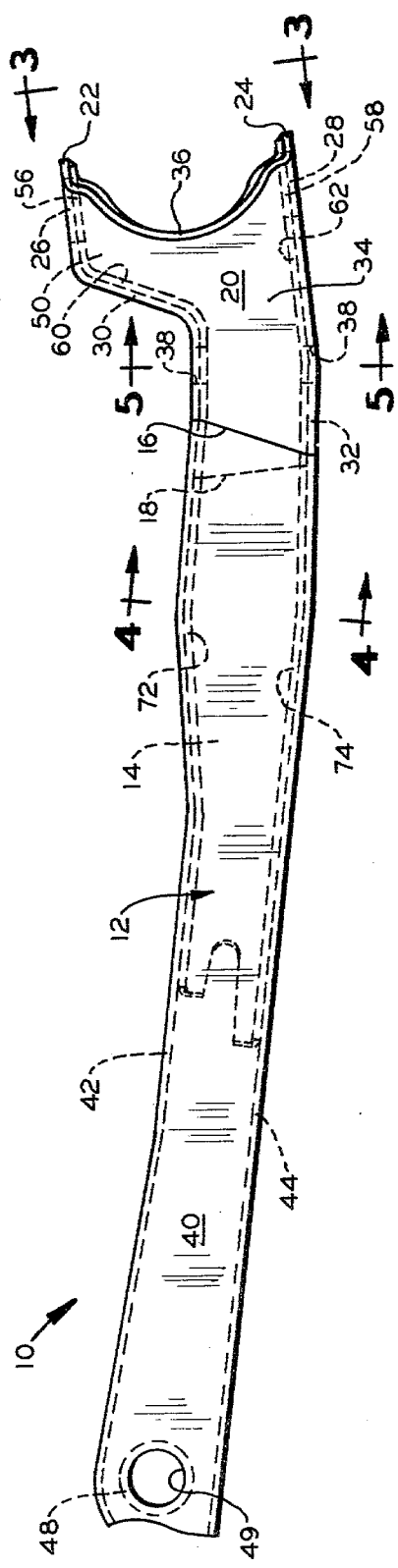
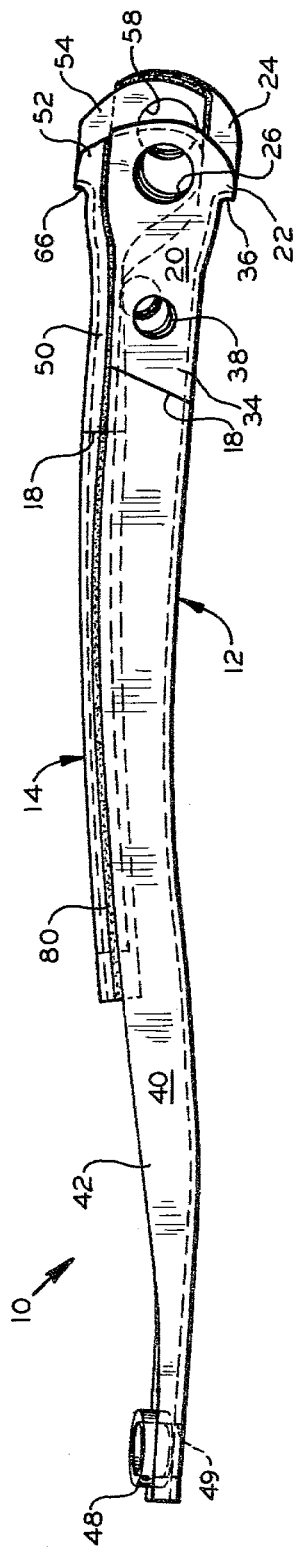

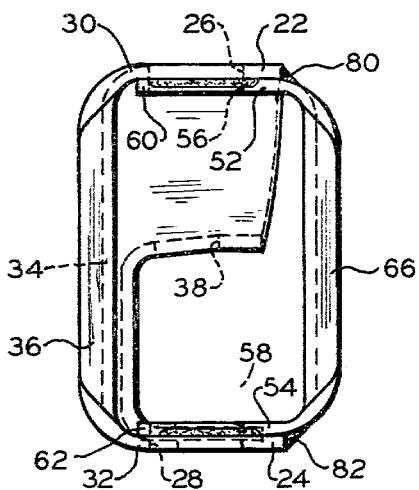

4,203,617

VEHICLE LOAD SUPPORTING STRUCTURE

BACKGROUND OF THE INVENTION

1. Field of the Invention

This invention relates in general to vehicle load supporting structures and in particular to vehicle axles and frame components formed of two or more pieces of sheet metal.

2. Description of the Prior Art

In recent years, there has been an increased demand from both the state and federal governments and the comsuming public for utility vehicles such as the light truck and van which achieve better gas mileage and increased payload. One area of concern is the axle which must be strong yet is an especially important area for weight savings since it represents unsprung weight. An early technique for weight savings was the replacement of the forged axle with a one piece pressed axle beam having a flanged, channel-shaped cross-section and upwardly formed end portions. This axle beam opens upwardly with the end portions being closed and reinforced by a contoured plate welded to the opposed beam flanges which serves as a spring seat and having knuckle pieces welded thereto for attachment to the vehicle wheels. Such a axle is shown in U.S. Pat. No. 3,072,441.

Still another attempt in producing a lighter weight sheet metal axle is illustrated and described in U.S. Pat. No. 2,218,217 wherein metal torque resisting parts are disposed to extend crosswise within the interior of the hollow beam member to resist shearing forces and bending strains.

U.S. Pat. No. 1,931,105 relates to a hollow vehicle axle arrangement formed of stamped metal members welded together to form a substantially integral structure of cross-section to withstand the stresses and strains imposed on critical portions of the axle.

The axle structure shown in U.S. Pat. No. 1,841,735 comprises a one piece tubular axle having the end portions thereof shaped and welded together to provide transversely extending cylindrical members with inturned annular flanges partially closing each end.

Another vehicle axle structure is illustrated in U.S. Pat. No. 1,219,153 wherein the axle body is formed of two parts generally C-shaped in cross-section having internally disposed reinforcing members welded thereto.

SUMMARY OF THE INVENTION

It is an object of the invention to produce load supporting assemblies for wheeled vehicles which is light in weight and exhibits the necessary resistance to shearing forces and bending strains in the required critical areas.

Another object of the invention is to produce load supporting assemblies for wheeled vehicles formed of two dissimilar yield strength materials to obtain the benefit of higher strength material in the regions requiring such strength and simultaneously retaining the cost advantage of lower strength material in the region of lower level loadings.

These and other objects of the invention are achieved by producing a load supporting structure comprising a formed elongate composite metal body having at least one portion formed to support a load and an adjacent portion to support a load, the first mentioned portion of metal body formed from metal having a predetermined yield strength and at least a portion of the adjacent portion of the metal body formed from a metal having a yield strength lower than the predetermined strength of the first mentioned portion, the first mentioned portion of the metal body being united to the adjacent portion of the body by a weld.

BRIEF DESCRIPTION OF THE DRAWINGS

The above and other objects and advantages of the invention will become readily manifest to one skilled in the art from reading the following detailed description of an embodiment of the invention when considered in the light of the attached drawings in which:

FIG. 1 is a front elevational view of a swing axle of an independent wheel suspension system for a vehicle incorporating the principle features of the invention;

FIG. 2 is a top plan view of the axle assembly illustrated in FIG. 1;

FIG. 3 is an end view of the axle assembly indicated in FIG. 1 taken along line 3—3 thereof;

FIG. 4 is a sectional view of the axle assembly illustrated in FIG. 1 taken along line 4—4 thereof;

FIG. 5 is a sectional view of the axle assembly illustrated in FIG. 1 taken along line 5—5 thereof;

FIG. 6 is an enlarged fragmentary exploded view of the front member of the axle assembly illustrated in FIGS. 1 and 2 prior to the joining of the portions thereof of different strength characteristics;

FIG. 7 is an enlarged fragmentary exploded view of the rear member of the axle assembly illustrated in FIGS. 1 and 2 prior to the joining of the portions thereof of different strength characteristics.

DETAILED DESCRIPTION OF PREFERRED EMBODIMENT

Figure 8:
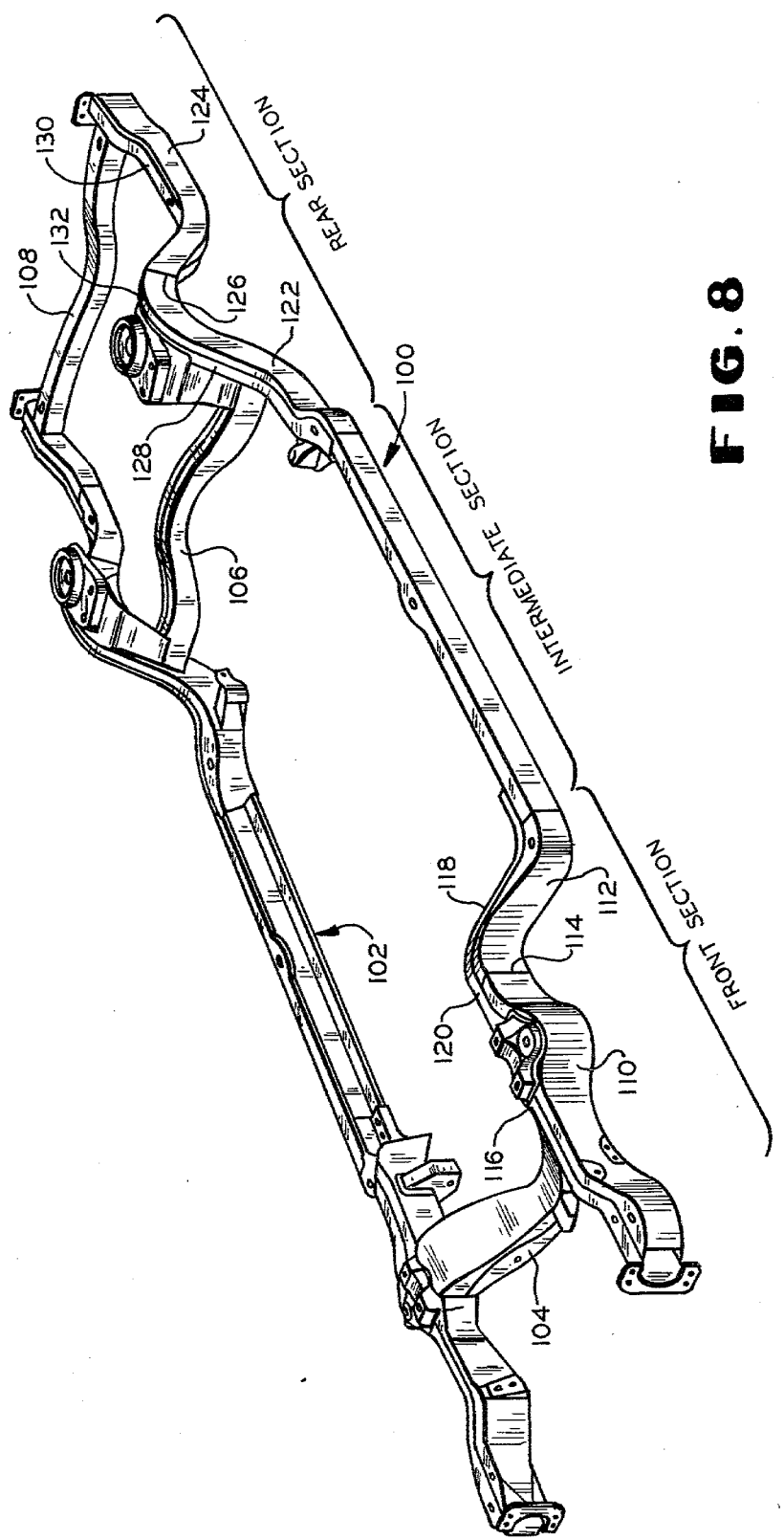
FIG. 8 is a perspective view of a vehicle frame assembly embodying the features of the present invention.

Referring to the drawings, and in particular to FIGS. 1–7, inclusive, there is shown a vehicle axle, generally indicated by reference numeral 10, basically consisting of a formed elongate composite body including a stamped sheet front member 12 and a cooperating stamped sheet metal rear member 14. The vehicle axle 10 illustrated in the drawings is of a type employed in an independent suspension for the front wheels of a motor vehicle.

While the inventive concepts of this disclosure are illustrated and described in connection with an independently sprung vehicle, it must be understood that the concepts could likewise be advantageously used in other suspension systems, such as those employing straight-through axle configurations, for example.

The front member 12 is formed by commencing with a sheet of metal having predetermined strength characteristics generally configured to result in the shape of an outer end portion 20 which has been previously butt welded, as at 16, to another sheet of metal of strength characteristics lower than the predetermined strength characteristics of the outer portion and generally configured to result in the shape of an inner portion 40. Typically, the outer end portion 20 may be formed of a high yield strength steel such as, for example, SAE 950, while the inner portion may be formed of a relatively lower yield strength steel such as, for example, SAE 1010. The carbon content of these steels is generally in the same range as the plain carbon steels. It is considered important that for the best welding and fatigue properties, the "carbon equivalent" should be compatible between the two portions being joined.

The outer end portion 20 of the front member 12 of the axle 10 terminates in a bifurcated shape having an upper flanged portion 22 and a lower flanged portion 24. The upper and lower flanged portions 22 and 24, respectively, are provided with apertures 26 and 28 respectively, the centerlines of which are inclined from the vertical approximately 6° in the illustrated embodiment, as is clearly apparent in FIGS. 1 and 2. Also, the outer portion 20 is provided with laterally extending upper and lower flanges 30 and 32, respectively, with an interconnecting web portion 34. The outermost edge portion of the web 34 between the upper flange 22 and the lower flange 24 is bent outwardly to form a strengthening line 36. The rearward extensions of the upper and lower flanges 30 and 32, respectively, are provided with aligned apertures 38, for example, to receive a cylindrical radius arm connector element, not shown.

The inner end portion 40 of the front member 12 of the axle 10 includes laterally extending upper and lower flanges 42 and 44 which are, in effect, continuations of corresponding flanges 30 and 32, respectively of the outer portion 20. The flanges 42 and 44 are interconnected by means of a web 46 which is an extension or continuation of the web 34 of the outer portion 20.

The inner end of the inner portion 40 contains a laterally extending boss 48 which is aligned with a hole 49 formed in the web 46. The boss 48 and hole 49 are provided to receive means for pivotally connecting the axle 10 to the associated vehicle frames.

The rear member 14 is formed by commencing with a sheet of metal having predetermined strength characteristics generally configured to result in the shape of an outer end portion 50 which has been previously butt welded as at 18, to another sheet of metal of strength characteristics lower than the predetermined strength characteristics of the outer end portion and generally configured to result in the shape of an inner end portion 70. Typically, the outer end portion 50 is formed of steel of the same type and gauge used to form the outer end portion 20 of the front member 12, while the inner end portion 70 is formed steel of the same type and gauge used to form the inner end portion 40 of the front member 12.

However, there is no need to form the various elements of the same type and gauge of steel. The inner end portion 70 of the rear member, for example, could be of the same type steel as the inner end portion 40 of the front member, but of lesser gauge depending upon the experienced strain levels induced in the part under service conditions. The gauge of the metal of the portions of the structure need not be the same, although approximately 0.030 inch of difference seems to be the practical maximum between the two adjacent welded elements.

It will be understood that the intent of this invention is to join the two metals of different strength characteristics while each is initially in a flat or "blank" state. The resultant single welded unit is then formed to the desired end configuration as if it were originally a single flat blanked shape.

The outer end portion 50 of the rear member 14 of the axle 10 terminates in a bifurcated shape having an upper flanged portion 52 and a lower flanged portion 54. The upper and lower flanged portions 52 and 54, respectively, are provided with apertures 56 and 58, respectively, the center lines of which are aligned in the assembled form of the axle 10 with the apertures 26 and 28 of the outer end portion 20 of the front member 12. The outer end portion 50 is provided with laterally extending upper and lower flanges 60 and 62, respectively, with an interconnecting web 64. The outermost edge portion of the web 64, between the upper flange 52 and the lower flange 54, is bent outwardly to form a strengthening lip 66.

The inner end portion 70 of the rear member 14 of the axle 10 includes laterally extending upper and lower flanges 72 and 74, which are, in effect, continuations of corresponding flanges 60 and 62, respectively, of the outer end portion 50. The flanges 72 and 74 are interconnected by means of a web 76 which is an extension or continuation of the web 64 of the outer portion 50. It will be noted from an examination of FIGS. 1, 2, 4, and 5 that the spacing between the outer surfaces of the flanges 60 and 62, and 72 and 74 of the rear member 14, is slightly less than the spacing of the inner surfaces of the corresponding flanges 30 and 32, and 42 and 44 of the front member 12, to enable the rear member 14 to be nested within the confines of the front member 12 in the assembled form. In order to maintain the front and rear members in an assembled form, welds 80 and 82 are formed to produce an integral axle assembly 10.

The sheets of metal of different yield and tensile strengths employed for forming the front member 12 and the rear member 14 may be joined together in any of the known manners; however, it has been found that resistance or "flash" welding techniques are indeed satisfactory. It will be understood that other methods, including electron beam welding techniques, could be utilized.

It will be appreciated that while the described and illustrated embodiment of the invention, thus far explained, finds particular application as a half axle member for the front wheel suspension of an independently sprung vehicle system, the principles set forth herein are applicable to other vehicle load supporting structures, and other independent suspension systems for vehicles, as well as for solid axle assemblies.

Also, the concepts of the invention lend themselves to incorporation in load supporting structures such as vehicle frame members wherein it is a desideratum of the design thereof to, in effect, manage or control the energy absorbing characteristics thereof by composite load supporting members comprised of at least two adjacent metal components of material having dissimilar yield strengths.

In FIG. 8, there is illustrated a vehicle frame assembly utilizing the features of the invention. The frame assembly includes a pair of similar spaced apart side frame members 100 and 102 interconnected by transversely extending cross members 104, 106, and 108. For ease of understanding and explanation, only a single side frame member will be specifically described, but it will be understood that both side frame members are typically formed in substantially the same manner and include the same structural components. Accordingly, the side frame member 100 includes a front section, an intermediate section, and a rear section all joined together in any suitable fashion to form an integral frame component. The front section typically includes an inner portion and an outer portion which, in the completed form, are nested together to form an integral part. The inner and outer portions are typically formed from originally flat sheet metal stock which in turn, are formed of two sections of differing yield and tensile strengths of substantially the same gauge and flash welded together to comprise a single sheet. The composite sheet is then subsequently formed, perforated, and trimmed to form the finished front. The outer portion of the front section, formed in the above method, is comprised of a portion 110 formed of sheet metal of given yield and tensile strength properties and an adjacent portion 112 formed of sheet metal of higher yield and tensile strength properties. The portions 110 and 112 are welded together, as described above, at the weld line 114. The inner portion of the front section formed in the above method, is comprised of a portion 116 formed of sheet metal having the same yield and tensile strength properties as the portion 110, and an adjacent portion 118 formed of sheet metal having the same yield and tensile strength properties as the portion 112. The portions 116 and 118 are welded together, as described above, at the weld line 120.

The rear section typically includes an inner and an outer portion similar to the front section. The outer portion is comprised of a formed composite metal sheet which includes a portion 122 of metal having a given yield and tensile strength properties and an adjacent portion 124 of metal having higher yield and tensile strength properties. The portions 122 and 124 have been previously welded together along a weld line 126. The inner portion of the rear section, formed in the above described method, is comprised of a portion 128 formed of sheet metal having the same yield and tensile strength properties as the portion 122, and an adjacent portion 130 formed of sheet metal having the same yield and tensile strength properties as the portion 124. The portions 128 and 130 are welded together, as described above, at the weld line 132.

It will be understood that, in assembling the inner and outer portions of the front and rear sections, the inner portions are typically nested within the outer portions and then joined together by flash welding techniques, for example.

In accordance with the provisions of the patent statutes, I have explained the principles and mode of operation of my invention, and have illustrated and described what I now consider to represent its best embodiments. However, I desire to have it understood that, within the scope of the appended claims, the invention may be practiced otherwise than as specifically illustrated and described.

The embodiments of the invention to which an exclusive property or privilege is claimed are defined as follows:

1. A vehicle load supporting structure including an elongate composite metal body wherein the metal body comprises:
   a first composite elongate section of generally C-shaped cross-section having a pair of spaced apart flanges and an interconnecting web defining an open channel, said section including at least two adjacent welded together portions, one portion having a predetermined yield strength, the other portion having a yield strength different from the yield strength of the first mentioned portion;
   a second composite elongate section of generally C-shaped cross-section having a pair of spaced apart flanges and an interconnecting web defining an open channel, including at least two adjacent welded together portions, one portion having a predetermined yield strength, the other portion having a yield strength different from the yield strength of the first mentioned portion; and
   means for securing free edges of the flanges of said first and said second sections together with the open channels of the C-shaped cross-sections of the respective sections are in facing relation to one another.

2. A structure according to claim 1 wherein means for securing said first and said second sections together includes a weld joint.

3. The structure according to claim 1 wherein the predetermined yield strength portions of said first and said second sections are juxtaposed, and the other portions of said first and said second sections having a different yield strength are justaposed.

4. The structure according to claim 1 wherein said elongate metal body is formed of sheet metal.

5. The structure according to claim 4 wherein the thickness of the sheet metal is substantially constant throughout the entire length thereof.

* * * * *